(12) United States Patent
Rounthwaite et al.

(10) Patent No.: US 7,249,162 B2
(45) Date of Patent: Jul. 24, 2007

(54) ADAPTIVE JUNK MESSAGE FILTERING SYSTEM

(75) Inventors: Robert L. Rounthwaite, Fall City, WA (US); Joshua T. Goodman, Redmond, WA (US); David E. Heckerman, Bellevue, WA (US); John C. Platt, Redmond, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 10/374,005

(22) Filed: Feb. 25, 2003

(65) Prior Publication Data

US 2004/0167964 A1    Aug. 26, 2004

(51) Int. Cl.
*G06F 15/16* (2006.01)
(52) U.S. Cl. ...................................... 709/206
(58) Field of Classification Search ................ 709/206, 709/203
See application file for complete search history.

(56) References Cited

U.S. PATENT DOCUMENTS

| | | | |
|---|---|---|---|
| 5,619,648 A | 4/1997 | Canale et al. | |
| 5,704,017 A | 12/1997 | Heckerman et al. | |
| 5,805,801 A | 9/1998 | Holloway et al. | |
| 5,884,033 A | 3/1999 | Duvall et al. | |
| 5,905,859 A | 5/1999 | Holloway et al. | |
| 6,047,242 A | 4/2000 | Benson | |
| 6,052,709 A | 4/2000 | Paul | |
| 6,072,942 A | 6/2000 | Stockwell et al. | |
| 6,101,531 A | 8/2000 | Eggleston et al. | |
| 6,112,227 A | 8/2000 | Heiner | |
| 6,161,130 A | 12/2000 | Horvitz et al. | |
| 6,167,434 A | 12/2000 | Pang | |

(Continued)

FOREIGN PATENT DOCUMENTS

EP         1376427         3/2003

(Continued)

OTHER PUBLICATIONS

European Search Report dated Apr. 6, 2006 and mailed Apr. 6, 2006 for EP 04102242, 3 pages.

(Continued)

*Primary Examiner*—Jason Cardone
*Assistant Examiner*—Minh-Chau N. Nguyen
(74) *Attorney, Agent, or Firm*—Amin, Turocy & Calvin, LLP

(57) ABSTRACT

The invention relates to a system for filtering messages—the system includes a seed filter having associated therewith a false positive rate and a false negative rate. A new filter is also provided for filtering the messages, the new filter is evaluated according to the false positive rate and the false negative rate of the seed filter, the data used to determine the false positive rate and the false negative rate of the seed filter are utilized to determine a new false positive rate and a new false negative rate of the new filter as a function of threshold. The new filter is employed in lieu of the seed filter if a threshold exists for the new filter such that the new false positive rate and new false negative rate are together considered better than the false positive and the false negative rate of the seed filter.

19 Claims, 9 Drawing Sheets

U.S. PATENT DOCUMENTS

| | | | |
|---|---|---|---|
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1* | 11/2001 | Sharnoff et al. | 707/5 |
| 6,321,267 B1 | 11/2001 | Donaldson | |
| 6,327,617 B1 | 12/2001 | Fawcett | |
| 6,330,590 B1 | 12/2001 | Cotten | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,633,855 B1 | 10/2003 | Auvenshine | |
| 6,643,686 B1 | 11/2003 | Hall | |
| 6,684,201 B1 | 1/2004 | Brill | |
| 6,691,156 B1 | 2/2004 | Drummond et al. | |
| 6,701,440 B1 | 3/2004 | Kim et al. | |
| 6,728,690 B1 | 4/2004 | Meek et al. | |
| 6,732,149 B1* | 5/2004 | Kephart | 709/206 |
| 6,732,157 B1 | 5/2004 | Gordon et al. | |
| 6,732,273 B1* | 5/2004 | Byers | 713/193 |
| 6,742,047 B1 | 5/2004 | Tso | |
| 6,751,348 B2 | 6/2004 | Buzuloiu et al. | |
| 6,757,830 B1 | 6/2004 | Tarbotto et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,842,773 B1 | 1/2005 | Ralston et al. | |
| 6,915,334 B1 | 7/2005 | Hall | |
| 6,928,465 B2 | 8/2005 | Earnest | |
| 6,971,023 B1 | 11/2005 | Makinson et al. | |
| 2001/0046307 A1 | 11/2001 | Wong | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0184315 A1 | 12/2002 | Earnest | |
| 2002/0199095 A1 | 12/2002 | Bandini et al. | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0167311 A1 | 9/2003 | Kirsch | |
| 2003/0200541 A1 | 10/2003 | Cheng et al. | |
| 2003/0204569 A1 | 10/2003 | Andrews et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0054887 A1 | 3/2004 | Paulsen et al. | |
| 2004/0073617 A1 | 4/2004 | Milliken et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0177120 A1 | 9/2004 | Kirsch | |
| 2004/0199585 A1 | 10/2004 | Wang | |
| 2004/0199594 A1 | 10/2004 | Radatti et al. | |
| 2005/0015455 A1 | 1/2005 | Liu | |
| 2006/0036701 A1 | 2/2006 | Bulfer et al. | |

FOREIGN PATENT DOCUMENTS

| | | |
|---|---|---|
| EP | 1376427 A2 | 1/2004 |
| EP | 1376427 A3 | 1/2004 |
| WO | 9967731 | 12/1999 |
| WO | WO 02/071286 | 9/2002 |
| WO | WO 2004/059506 | 7/2004 |

OTHER PUBLICATIONS

Graham. "The Future of SPAM" (2003) Computer Journal, CSI Computer Security Institute, vol. 19, No. 1, 6 pages.

International Search (report dated Jan. 17, 2006, mailed Jan. 31, 2006, for PCT Application Search No. PCT/US04/05501, 2 Pages.

Written Opinion of the Internatioanl Preliminary Examining Authority mailed Nov. 30, 2005 for PCT/US03/41526, 5 pages.

Valencia Martin-Wallace. International Search Report. Jul. 20, 2005. 6 pages.

Written Opinion mailed Nov. 30, 2005 for PCT Application Serial No. PCT/US03/41526, 5 pages.

Breiman, Friedman, Olshen, and Stone. "Classification and Regression Trees." Wadsworth & Brooks, Monterey, CA (1984).

Quinlan. "C4.5: Programs for Machine Learning." Morgan Kaufmann, San Francisco, CA (1993).

Hayes, Brian. "Spam, Spam, Spam, Lovely Spam." American Scientist Online, Jun. 30, 2003. pp. 1-6. vol. 91.

Partial European Search Report, EP05100847, mailed Jun. 21, 2005, 5 pages.

European Search Report, dated Jun. 9, 2005, mailed Aug. 22, 2005 for European Patent Application Serial No. EP04011978, 12 pages.

U.S. Appl. No. 10/208,150, filed Jul. 29, 2002, Kristian Andaker.

U.S. Appl. No. 09/893,941, filed Jun. 28, 2001, Horvitz et al.

U.S. Appl. No. 10/278,591, filed Oct. 23, 2002, Heckerman et al.

U.S. Appl. No. 10/180,565, filed Jun. 26, 2002, Goodman et al.

U.S. Appl. No. 09/497,992, filed Feb. 4, 2000, Maller.

U.S. Appl. No. 10/291,260, filed Nov. 8, 2002, Burrows et al.

Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.

Massey, B., et al., Learning Spam: Simple Techniques for Freely-Available Software Proceedings of Freenix Track 2003 Usenix Annual Technical Conference, Online!, Jun. 9, 2003, pp. 63-76, Berkley, CA, USA.

Graham, P., The Future of Spam, Computer Security Journal, CSI Computer Security Institute, vol. 19, No. 1, Jan. 2003, pp. 1-5.

Graham, P., A Plan for Spam, Online!, Aug. 2002, XP002273602, http://www.paulgraham.com/spam.html, retrieved on Mar. 12, 2004.

European Search Report, EP31087TE900, mailed Nov. 11, 2004.

J. Byrne, My Spamblock, Google, Jan. 19, 1997, 2 pages.

D. F. Skoll, How to Make Sure a Human is Sending You Mail, Google, Nov. 17, 1996, 2 pages.

L. M. Bowman, Hotmail Spam Filters Block Outgoing E-Mail, CNET NEWS.COM, Jan. 18, 2001, 3 pages.

Thorsten Joachims, Transductive Inference for Text Classification Using Support Vector Machines, In Proceedings of the 16th International Conference on Machine Learning, 1999, pp. 200-209, San Francisco, USA.

Kevin R. Gee, Using Latent Semantic Indexing to Filter Spam, Dept. of Computer Science and Engineering, University of Texas-Arlington, 5 pages, 2003.

Fabrizio Sebastiani. Machine Learning in Automated Text Categorization. ACM Computing Surveys, vol. 34 Issue 1, pp. 1-47, 2002.

I. Androutsopoulos, et al. Learning to Filter Spam E-mail: A Comparison of a Naive Bayesian and a Memory-based Approach. 4th PKDD's Workshop on Machine Learning and Textual Information Access, 2000. 13 pages.

I. Androutsopoulos,et al., An Experimental Comparison of Naive Bayesian and Keyword-based Anti-spam Filtering with Personal E-mail Messages. Proceedings of the 23rd ACM SIGIR Conference, pp. 160-167, 2000.

P. Pantel, et al., SpamCop: A Spam Classification & Organization Program. In Proc. AAAI-1998 Workshop on Learning for Text Categorization, 1998. 8 pages.

G. Manco, et al., Towards an Adaptive Mail Classifier. In Proc. of Italian Association for Artificial Intelligence Workshop, 2002. 12 pages.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI 10/02, 2002, pp. 111-118, Arhus, Denmark.

Lorrie Faith Cranor, et al., Spam!, Communications of the ACM, 1998, pp. 74-83, vol. 41-No. 8.

John Wong, Preventing Spams and Relays, Linux Journal, Dec. 1998, 6 pages, vol. 1998 Issue 56es, Specialized Systems Consultants, Inc.

Meng Weng Wong, SPF Overview, Linux Journal, Apr. 2004, 6 pages, vol. 2004 Issue 120, Specialized Systems Consultants, Inc.

Stop, in the Name of Spam, Communications of the ACM, Nov. 1998, pp. 11-14, vol. 41 No. 11, ACM.

Eric Allman, Spam, Spam, Spam, Spam, Spam, the FTC, and Spam, Queue, Sep. 2003, pp. 62-69, vol. 1 Issue 6, ACM.

Tom Fawcett, "In vivo" Spam Filtering: A Challenge Problem for KDD, SIGKDD Explorations, Dec. 2003, pp. 140-148, vol. 5 Issue 2, ACM.

J.D.M. Rennie, ifile: An Application of Machine Learning to E-Mail Filtering. Proceedings of the KDD-2000 Workshop on Text Mining, Sixth ACM SIGKDD International Conference on Knowledge Discovery and Data Mining, 2000. 6 pages.

S. Argamon, et al., Routing documents according to style. In First International Workshop on Innovative Information Systems, 1998. 8 pages.

K. Mock, An Experimental Framework for Email Categorization and Management. Proceedings of the 24th Annual International ACM SIGIR Conference, pp. 392-393, 2001.

Jose Maria Gomez Hidalgo, Evaluating Cost-Sensitive Unsolicited Bulk Email Categorization, SAC 2002, 2002, pp. 615-620, ACM, Madrid, Spain.

A.Z. Broder, et al. Syntactic Clustering of the Web. SRC Technical Note, Digital Corporation, Jul. 25, 1997. 13 pages.

P.Y. Simard, et al., Using Character Recognition and Segmentation to Tell Computer from Humans. International Conference on Document Analysis and Recogntion (ICDAR), IEEE Computer Society, Los Alamitos, pp. 418-423, 2003.

S. Li et al., Secure Human-Computer Identification against Peeping: A Survey. Technical Report, Microsoft Research, 2003. 53 pages.

D.A. Turner et al., Controlling Spam through Lightweight Currency. In Proc. of the Hawaii International Conference on Computer Sciences, Jan. 2004. 9 pages.

D. Turner et al., Payment-based Email. 5th International Conference on Software Engineering, Artificial Intelligence, Networking, and Parallel/Distributed Computing, Jun. 2004. 7 pages.

David Madigan, Statistics and The War on Spam, Rutgers University, 2003, pp. 1-13.

Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.

Mark Rosen, E-mail Classification in the Haystack Framework, Massachusetts Institute of Technology, Feb. 2003, 103 pages.

European Search report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. 06 01 2631, 3 pages.

Federal Trade Commission. "False Claims in Spam", A report by the FTC's division of marketing practices, Apr. 30, 2003, http://www.ftc.gov/reports/spam/030429spamreport.pdf.

Hansell. "Internet is losing ground in battle against spam", The New York Times: Technology section, Apr. 30, 2003, 2003.

* cited by examiner

ADAPTIVE JUNK MESSAGE FILTERING SYSTEM

CROSS-REFERENCE TO RELATED APPLICATIONS

This application is related to the following patent(s) and patent application(s), the entirety of which are incorporated herein by reference: U.S. Pat. No. 6,161,130 entitled "TECHNIQUE WHICH UTILIZES A PROBABILISTIC CLASSIFIER TO DETECT JUNK E-MAIL BY AUTOMATICALLY UPDATING A TRAINING AND RE-TRAINING THE CLASSIFIER BASED ON THE UPDATING TRAINING SET"; U.S. patent application Ser. No. 09/448,408 entitled "CLASSIFICATION SYSTEM TRAINER EMPLOYING MAXIMUM MARGIN BACK-PROPAGATION WITH PROBABILISTIC OUTPUTS" filed Nov. 23, 1999, and U.S. patent application Ser. No. 10/278,591 entitled "METHOD AND SYSTEM FOR IDENTIFYING JUNK E-MAIL" filed Oct. 23, 2002.

TECHNICAL FIELD

This invention is related to systems and methods for identifying undesired information (e.g., junk mail), and more particularly to an adaptive filter that facilitates such identification.

BACKGROUND OF THE INVENTION

The advent of global communications networks such as the Internet has presented commercial opportunities for reaching vast numbers of potential customers. Electronic messaging, and particularly electronic mail ("e-mail"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies, . . . ) are becoming increasingly inconvenienced and oftentimes offended by junk messages. As such, junk e-mail is now or soon will become a major threat to trustworthy computing.

A key technique utilized to thwart junk e-mail is employment of filtering systems/methodologies. One proven filtering technique is based upon a machine learning approach—machine learning filters assign to an incoming message a probability that the message is junk. In this approach, features typically are extracted from two classes of example messages (e.g., junk and non-junk messages), and a learning filter is applied to discriminate probabilistically amongst the two classes. Since many message features are related to content (e.g., words and phrases in the subject and/or body of the message), such types of filters are commonly referred to as "content-based filters".

Some junk/spam filters are adaptive, which is important in that multilingual users and users who speak rare languages need a filter that can adapt to their specific needs. Furthermore, not all users agree on what is and is not, junk/spam. Accordingly, by employing a filter that can be trained implicitly (e.g., via observing user behavior) the respective filter can be tailored dynamically to meet a user's particular message identification needs.

One approach for filtering adaptation is to request a user(s) to label messages as junk and non-junk. Unfortunately, such manually intensive training techniques are undesirable to many users due to the complexity associated with such training let alone the amount of time required to properly effect such training. Another adaptive filter training approach is to employ implicit training cues. For example, if the user(s) replies to or forwards a message, the approach assumes the message to be non-junk. However, using only message cues of this sort introduces statistical biases into the training process, resulting in filters of lower respective accuracy.

Still another approach is to utilize all user(s) e-mail for training, where initial labels are assigned by an existing filter and the user(s) sometimes overrides those assignments with explicit cues (e.g., a "user-correction" method)—for example, selecting options such as "delete as junk" and "not junk"—and/or implicit cues. Although such an approach is better than the techniques discussed prior thereto, it is still deficient as compared to the subject invention described and claimed below.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for a system and method that facilitates employment of an available filter (e.g., seed filter or new filter) best suited to identify junk/spam messages. The invention makes use of a seed filter that provides for filtering messages, and having associated therewith a false positive rate (e.g., non-junk mail incorrectly classified as junk) and a false negative rate (e.g., junk mail incorrectly classified as non-junk). A new filter is also employed for filtering the messages—the new filter is evaluated according to the false positive rate and the false negative rate associated with the seed filter. The data used to determine the false positive and false negative rates of the seed filter are utilized to determine new false positive and false negative rates of the new filter as a function of the threshold.

The new filter is employed in lieu of the seed filter if a threshold exists for the new filter such that the new false positive rate and new false negative rate are together considered better than the false positive and false negative rates of the seed filter. The new false positive rate and new false negative rate are determined according to message(s) that are labeled by a user as junk and non-junk (e.g., via employment of a user-correction process). The user-correction process includes overriding an initial classification of the message, the initial classification being performed automatically by the seed filter when the user receives the message. The threshold can be a single threshold value, or selected from a plurality of generated threshold values. If a plurality of values are employed, the selected threshold value can be determined by selecting, for example, a midpoint threshold value of the range of eligible threshold values (e.g., the threshold value with the lowest false positive rate, or the threshold value that maximizes the user's expected utility based upon a p* utility function). Alternatively, the threshold value can be selected only if the false positive and false negatives rates of the new filter are at least as good as those of the seed filter at that selected threshold, and one is better. Additionally, selection criteria can be provided so that the new filter is selected only if the new filter rates are better than the seed filter rate not only at the selected threshold, but also at other nearby thresholds.

Another aspect of the invention provides for a graphical user interface that facilitates data filtering. The interface provides a filter interface that communicates with a configuration system in connection with configuring a filter. The interface provides a plurality of user-selectable filter levels including at least one of default, enhanced, and exclusive. The interface provides various tools that facilitate carrying out the aforementioned system and method of the present invention.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
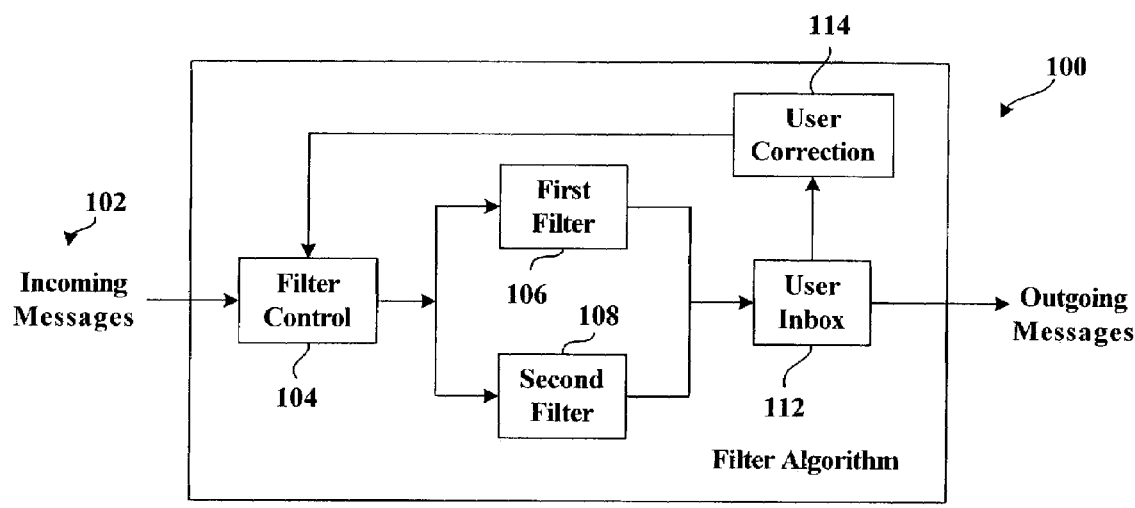
FIG. 1 illustrates a general block diagram of a filter system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with junk message filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter could be configured to automatically filter particular message content (text and images) in order to capture and tag as junk the undesirable content (e.g., commercials, promotions, or advertisements).

Referring now to FIG. 1, there is illustrated a junk-message detection system 100 in accordance with the subject invention. The system 100 receives an incoming stream of message(s) 102 which can be filtered to facilitate junk message detection and removal. The message(s) 102 are received into a filter control component 104 that can route the message(s) 102 between a first filter 106 (e.g., seed filter) and a second filter 108 (e.g., new filter), depending on filtering criteria determined according to an adaptive aspect of the present invention. Accordingly, if the first filter 106 is determined to be sufficiently efficient in detecting junk messages, the second filter 108 will not be employed, and the filter control 104 will continue to route the message(s) 102 to the first filter 106. However, if the second filter 108 is determined to be at least as efficient as the first filter 106, the filter control 104 can decide to route the message(s) 102 to the second filter 108. The criteria utilized to make such determination are described in greater detail infra. When initially employed, the filter system 100 can be configured to a predetermined default filter setting, such that the message(s) 102 will be routed to the first filter 106 for filtering (e.g., as is typical when the first filter 106 is an explicitly trained seed filter shipped with a particular product).

Based upon setting(s) of the first filter 106, a message received into the first filter 106 will be interrogated for junk information associated with junk data. The junk information may include, but is not limited to, the following: sender information (from a sender who is known for sending junk mail) such as source IP address, sender name, sender e-mail address, sender domain name, and unintelligible alphanumeric strings in identifier fields; message text terms and phrases commonly used in junk mail such as "loan", "sex", "rate", "limited offer", "buy now", etc.; message text features, such as font size, font color, special character usage; and embedded links to pop-up advertising. The junk data can be determined based at least in part upon predetermined as well as dynamically determined junk criteria. The message is also interrogated for "good" data, such as words like "weather" and "team" that do no typically appear in junk mail, or mail that is from a sender or sender IP who is known for sending only good mail. It is appreciated that if the product were shipped without a seed filter, initially, without any established filtering criteria, all messages pass untagged through the first filter 106 into a user's inbox 112 (also denoted the first filter output). It is to be appreciated that the inbox 112 can simply be a data store residing at a variety of locations (e.g., a server, mass storage unit, client computer, distributed network . . . ). Moreover, it is to be appreciated that the first filter 106 and/or second filter 108 can be employed by a plurality of users/components and that the inbox 112 can be partitioned to store messages separately for the respective users/components. Furthermore, the system 100 can employ a plurality of secondary filters 108 such that a most appropriate one of the secondary filters is employed in connection with a particular task. Such aspects of the subject invention are discussed in greater detail below.

As the user reviews the mailbox messages, some messages will be determined to be junk and others will not. This is based in part upon explicitly tagging junk mail or non-junk mail by the user, e.g. by pressing a button, and via implicitly tagging the messages through user actions associated with the particular message. A message can be implicitly determined to not be junk based upon, for example, the following user actions or message processes: the message is read and remains in the inbox; the message is read and forwarded; the message is read and placed in any folder, but the trash folder; the message is responded to; or the user opens and edits the message. Other user actions can also be defined to be associated with non-junk messages. A message can be implicitly determined to be junk based upon, for example, not reading the message for a period of a week, or deleting the message without reading it. Thus the system 100 monitors these user actions (or message processes) via a user correction component 114. These user actions or message processes can be preconfigured into the user correction component 114 so that as the user initially reviews and performs actions on the messages, the system 100 can begin developing the false positive rate and false negative rate data for the first filter 106. Substantially any user action (or message process) not preconfigured into the user correction block 114 will automatically allow the "unknown" message through to the filter output 112 untagged until the system 100 adapts to address such message types. It is to be understood that the term "user" as employed herein is intended to include: a human, a group of humans, a component as well as a combination of human(s) and component(s).

When a message in the user inbox 112 is received as an untagged message, but is actually a junk message, the system 100 processes this as a false negative data value. The user correction component 114 then feeds this false negative information back to the filter control component 104 as a data value employed to ascertain efficacy of the first filter 106. On the other hand, if the first filter 106 tags a message as junk mail when it is not actually a junk message, the system 100 processes this as a false positive data value. The user correction component 114 then feeds this false positive information back to the filter control 104 as a data point used in connection with determining effectiveness of the first filter 106. Thus as the user corrects messages received in the user inbox 112, the false negative and false positive data is developed for the first filter 106.

The system 100 determines whether there exists a threshold for the second filter 108 such that the false positive and false negative rates thereof are lower (e.g., within an acceptable probability) than those for the first filter 106. If so, the system 100 selects one of the acceptable thresholds. The system may also select the second filter when the false positive rate is equally good, and the false negative rate is better, or when the false negative rates are equally good, and the false positive rate is better. Thus, the invention provides for determining whether there is a threshold (and what that threshold should be) for the second filter 108 that guarantees, within an acceptable probability, that the second filter offers equal or better utility with respect to junk detection, regardless of a particular user's utility function and whether the user has unfailingly corrected mistakes of the first filter 106.

The system 100 trains the new (or second) filter 108 based upon a need for new training in view of user verification of false positive and false negative identifications. More particularly, the system 100 employs data tagged with junk and non-junk labels determined via a user-correction method. Using this data, false positive (e.g., non-junk messages erroneously labeled junk) rate and false negative (e.g., junk messages erroneously labeled non-junk) rate are determined for the first (e.g., existing or seed) filter 106. The same data is employed to learn (or "train") the new (e.g., second) filter 108—the data is also employed in connection with determining the second filter's false positive and false negative rates as a function of threshold. Since the evaluation data is the same as that used to train the second filter, a cross-validation approach is preferably employed as discussed in greater detail below—cross validation is a technique well known to those skilled in the art. If the second set of data is determined to be at least as good as the first set, the second filter 108 is enabled. The control component 104 then routes all incoming messages to the second filter 108 until the rate comparison process determines that filtering should be shifted back to the first filter 106, which now has better filtering utility.

One particular aspect of the invention relies upon two premises. The first premise is that the first verification (e.g., user correction) contains no errors (e.g., the user does not delete as junk a message that is non-junk). Under this premise, data labels, while not always correct, are "at least as correct" as labels assigned by the first filter 106. Thus, if the second filter 108 has no less utility than the existing filter according to such labels, a true expected utility of the second filter 108 can be no worse than that of the first filter 106. The second premise is that lower false positive and false negative rates are desired. In accordance with such premise, if both error rates of the second filter 108 are not greater than those of the first filter 106, then the second filter 108 is at least as good as the first filter 108 with respect to junk detection as the first filter 106, regardless of the user's specific utility function.

One reason that the second filter 108 may not always be as efficient as the first filter is that the second filter is based upon less data than the first filter 106. The first filter 106 might be a "seed" filter having seed data that is generated from other users' data. Essentially, most if not all adaptive filters ship with a seed filter so that the user is provided with a filter configuration that will identify typical junk e-mail messages without the user being required to configure the filter—this offers a good "out-of-the-box" experience to an inexperienced computer user. Another reason that the second filter 108 may not always be as efficient as the first filter 106 is more subtle. It depends on two facts: filters are not perfect, and may not be calibrated. Both of these facts are discussed in turn, and then we will return to the issue of determining whether the second filter 108 is better.

Figure 2:
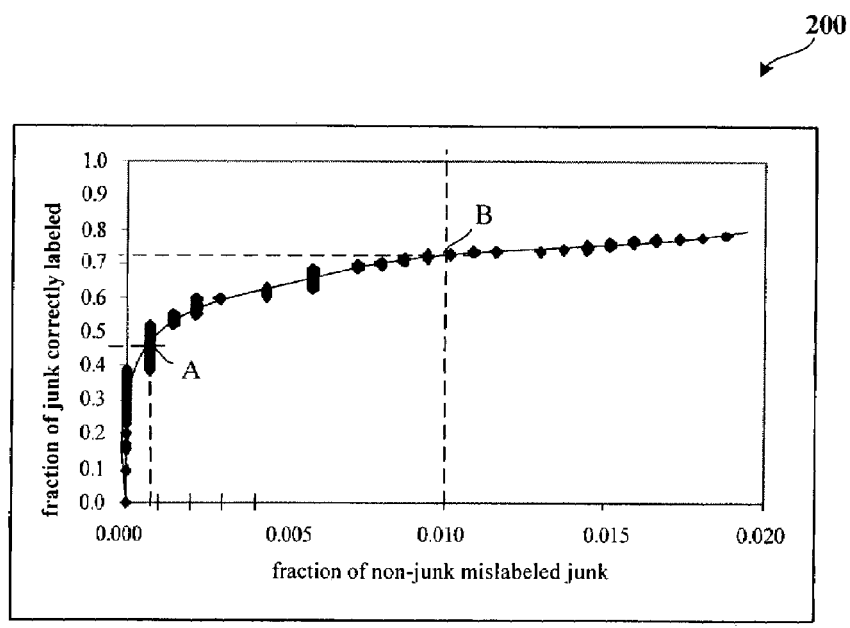
FIG. 2 illustrates a graph of performance tradeoffs with respect to catch rate.

Referring now to FIG. 2, there is illustrated a graph of performance tradeoffs with respect to catch rate (percentage of spam correctly labeled, equal to one minus the false negative rate) and false positive rate (percentage of non-junk labeled junk). As indicated herein and as would be appreciated by one skilled in the art, no filter is perfect. Thus there are tradeoffs between identifying and catching more junk messages versus accidentally mislabeling non-junk messages as junk. This performance tradeoff (also denoted herein as accuracy rate) is depicted in what is known as a receiver-operator curve (ROC) 200. Each point on the curve corresponds to a different tradeoff. A user selects an "operating point" for a filter by adjusting a probability threshold, or the probability threshold may be preset. When the probability p that a message is junk (as deemed by the filter) exceeds this threshold, the message is labeled as junk. Thus if the user decides to operate in a regime where an accuracy rate is high (e.g., the number of false positives is low compared to the number of correctly labeled messages), then the operating point on the curve 200 is closer to the origin. For example, if the user selects an operating point A on the ROC 200, the false positive rate is approximately 0.0007 and the corresponding y-axis value for the number of correctly labeled messages is approximately 0.45. The user will have a rounded filter accuracy rate of 0.45/0.0007=643, that is, one false positive message for approximately every six hundred forty-three messages that are correctly labeled. On the other hand, if the operating point is at a point B, the lower accuracy rate is calculated at approximately 0.72/0.01=72, or there will be one false positive for approximately every seventy-two messages that are correctly labeled.

Diverse users will make such tradeoffs differently with respect to their individually unique set of preferences—in the language of decision theory, different people have different utility functions for junk message filtering. For example, one class of users may be indifferent to incorrect labeling of a non-junk message and the failure to catch N junk messages. For users in this class, the optimal probability threshold (p*) for junk can be defined via the following relationship:

$$p^* = N/(N+1)$$

wherein N is the number of messages, and N can vary among users per class.

Thus users in this class are said to have a "p* utility function." With this understanding, if a user has a p* utility function, and if the second filter is calibrated, then an optimal threshold can be chosen automatically—namely, the threshold should be set to p*. Another class of users may want no more than X % of his or her non-junk e-mail labeled junk. For these users, the optimal threshold depends on the distribution of probabilities that the second filter 108 assigns to messages.

The second notion is that filters may or may not be capable of being calibrated. A calibrated filter has the property that when it determines with probability p that a set of e-mail messages is junk, then p of those messages will be junk. Many machine-learning methods generate calibrated filters, provided the user religiously corrects the mistakes of the existing filter. If the user corrects mistakes only some of the time (e.g., less than 80%), the filter(s) will likely not be calibrated—these filters will be calibrated with respect to the incorrect labels, but non-calibrated with respect to the true labels. The subject invention on the other hand provides a means for determining whether there is a threshold (and what that threshold should be) for the second filter 108 that guarantees (within some probability) that the second filter 108 offers equal or better utility to the user than the first filter 106, regardless of the user's utility function and whether the user has religiously corrected the mistakes of the existing filter 106.

Figure 3:
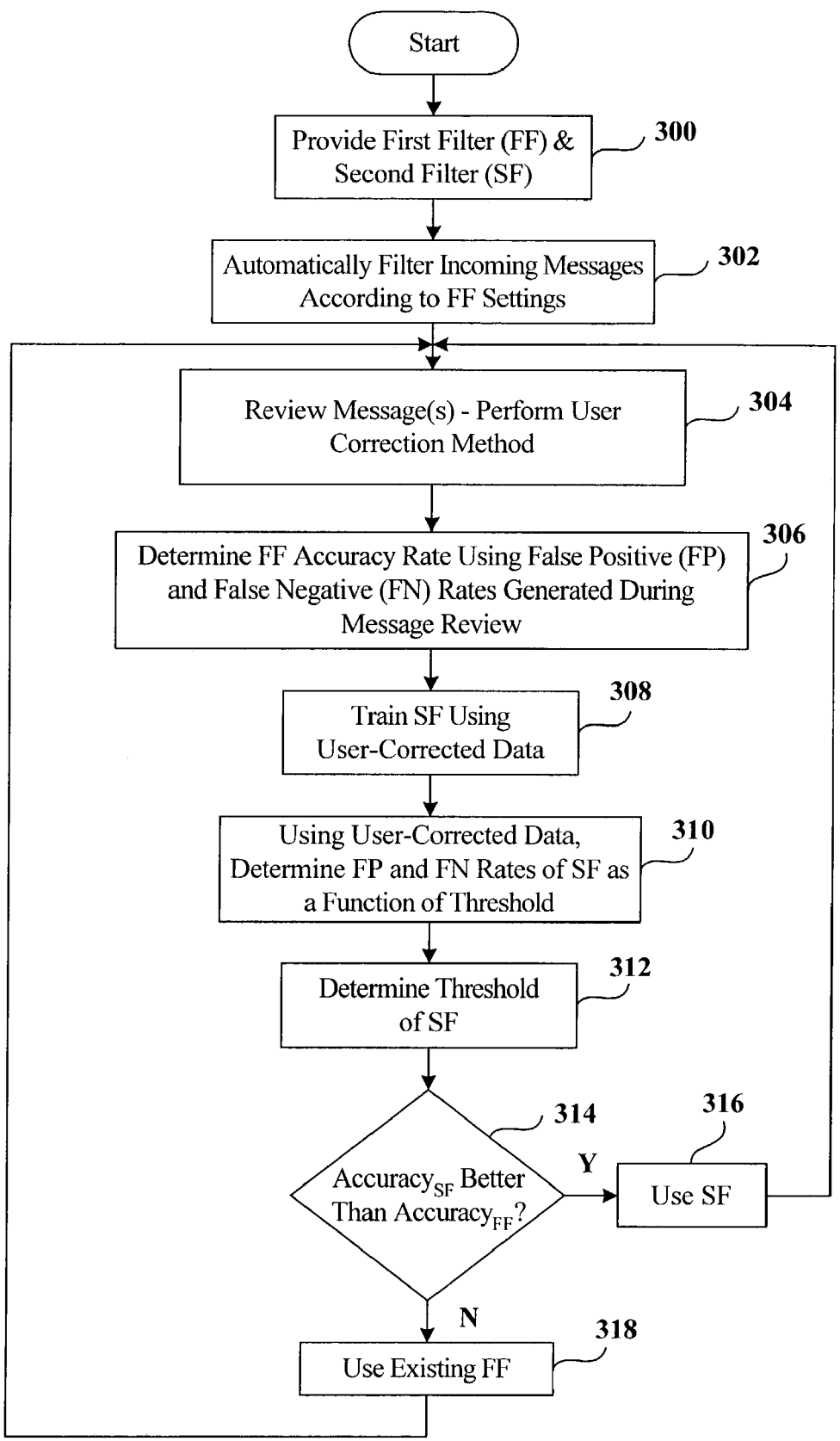
FIG. 3 illustrates a flow chart of a methodology in accordance with the subject invention.

Referring now to FIG. 3, there is illustrated a flow diagram of a process in accordance with one aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The basic approach relies on two assumptions. One assumption is that the user corrections contain no errors (an example error would be when the user deletes as junk a message that is not junk.) Under such assumption, the labels on the data, while not always correct, are "at least as correct" as the labels assigned by a first/seed filter. Thus, if a second filter has no less utility than the first filter according to these labels, the true expected utility of the second filter is no worse than that of the first filter. The second assumption is that all users prefer lower false positive and false negative rates. Under this assumption, if both error rates of the second filter are not higher than those of the first filter, then the second filter is no worse than the first filter, regardless of the user's specific utility function.

At 300, the first and second filters are provided with a means to interface thereto (e.g., to change settings, and generally control setup and configuration of the filters). At 302, the first filter is configured to automatically filter incoming messages according to one or more filter settings. The settings can include default settings provided by the manufacturer. Once the filtered messages are received (e.g., into an inbox), at 304 the messages are reviewed and a determination (e.g., via user correction method) is made as to which non-junk messages were erroneously tagged as junk (e.g., false positives) and what junk messages were not tagged as junk (e.g., false negatives). At 304, the user-correction function can be performed by tagging the false negative messages as junk mail, either explicitly or implicitly, and removing tags of false positive messages as non-junk. Such user-correction function provides an accuracy rate for the first filter via determining its false positive and false negative rate data. At 308, the second filter(s) is trained in accordance with the user-corrected data of the first filter 106. The same data is then utilized to determine the second filter's false positive and false negative rates as a function of threshold, as indicated at 310. At 312, the threshold value is determined. A determination is made as to whether there exists a threshold for the second filter(s) such that the associated false positive and false negative rates are lower than those rates of the first filter (within some reasonable probability). That is, to determine, as indicated at 314, if the accuracy rate of the second filter (Accuracy$_{SF}$) is better than the accuracy rate of the first filter (Accuracy$_{FF}$). If YES, the appropriate threshold is selected and the second filter is deployed for filtering the incoming message, as indicated at 316. If NO, the process proceeds to 318 wherein the first filter is retained to perform incoming message filtering. The process dynamically cycles through the aforementioned acts as necessary.

The accuracy analysis process can occur each time the user-correction function occurs such that the second filter(s) can be employed or deactivated at anytime based upon the threshold determination. Because the evaluation data of the first filter is the same as that used to train the second filter(s), a cross validation approach is employed. Namely, data is segmented into k buckets (k being an integer) for each user-correction process, and for each bucket, the second filter is trained using the data in the other k−1 buckets. The performance (or accuracy) of the second filter is then evaluated for a selected bucket from the k−1 buckets. Another possibility is to wait until N1 and N2 of messages with junk and non-junk labels, respectively, are accumulated (e.g., N1=N2=1000) and then re-run every time N3 and N4 additional junk and non-junk messages are accumulated (e.g., N3=N4=100). Another alternative is to schedule such process based on calendar time.

If there is more than one threshold value making the second filter(s) no worse than the first filter, several alternatives exist for selecting which threshold values to employ. One alternative is to choose a threshold that maximizes the user's expected utility under the assumption that the user has a p* utility function. Another alternative is to select the threshold with lowest false positive rate. Still another alternative is to elect a midpoint of the range of eligible threshold values.

Addressing uncertainty in the measured error rates, let k1 and k2 be the number of not-junk (or junk) mislabeling errors from the first and second filters, respectively. A simple statistical analysis indicates that if:

$$k1-k2 \geq f\sqrt{(k1+k2)},$$

then it can be posited that one can be approximately ~x % sure that the error rate of the second filter is no worse than the first filter (e.g., when f=2, x=97.5; when f=0; x=50). To be conservative, if either k1 or k2 is equal to zero, then the value of one should be used in the square root (sqrt) term. Note that x is a conservatism adjustment—when x is close to 100, the certainty must be higher that the second filter(s) is better than the first filter before deploying the second filter(s). This certainty (or uncertainty) computation includes the assumption that the errors between the first and second filter(s) are independent. One approach to avoid this assumption is to estimate the number of errors in common, that is, the number of errors that there should be under the assumption of independence. If k more errors than this number are found, replace k1 and k2 with (k1−k) and (k2−k) in the above computation. Additionally, as the number of messages in the training data increases, it becomes more likely that the second filter(s) will be more accurate (at any threshold) than the first filter. The uncertainty estimates above ignore such "prior knowledge". Those skilled in the art familiar with Bayesian probablistics/statistics will recognize that there are principled methods for incorporating this prior knowledge into estimates of uncertainty.

In one aspect of the basic approach, imagine that a junk message is labeled as non-junk by the first filter. Further, suppose that the user does not correct this mistake, and so the system by default determines this message to not be junk. The second filter, having more accurate training data, may label this message as junk. Consequently, the false positive rate for the first filter would be underestimated, whereas the false positive rate for the second filter overestimated. This effect is amplified by the fact that most junk e-mail filters operate at a threshold where many junk messages are labeled as not junk so as to keep the false positive rate low.

There are several approaches that can be used in combination to address this aspect of the basic approach. A first approach is to assume that the user has a p* utility function with, for example, N=20 and deploy the second filter(s) whenever a threshold can be found that makes the second filter(s) no worse than the first filter. Here, the second filter(s) may be deployed even though, for example, the false positive rate of the second filter(s) is greater than that of the first filter. That is, under this approach, the second filter(s) is more likely to be deployed.

A second approach is to restrict the test set so that messages labeled non-junk are indeed known to be not junk with a high degree of certainty. For example, the test set includes only messages that were labeled by the user selecting the "not junk" button, messages that were read and not deleted, messages that were forwarded, and messages to which the user replied.

A third approach is that the system can use probabilities generated by a calibrated filter (e.g., the first filter) to generate a better estimate of the false positive rates for the second filter. Namely, rather than simply counting the number of messages with a non-junk label in the data and a junk label from the first filter, the system can sum the probability (according to a calibrated filter) that each such message is normal (non-junk). This sum will be less than the count, and will be a better estimate of the count had the user thoroughly corrected all of the messages.

In a rather simpler fourth approach, the expected number of times that the user will correct labels using the "not junk" and "junk" buttons is monitored. Here, expectation is taken with respect to a filter that is known to be calibrated (e.g., the first/seed filter). If the actual number of corrections falls below the expected numbers (in absolute number or percentage), then the system does not train the second filter(s).

In practice, the user interface may provide multiple thresholds, from which the user can choose one. In this situation, the new filter is deployed only if it is better than the seed filter at the threshold selected by the user. In addition, however, it is desirable that the new filter be better than the seed filter at other threshold settings, especially those settings near the user's current selection. The following algorithm is one such method of facilitating this approach. Input a parameter called, for example, SliderHalfLife (SHL), which is a real number with a default value of 0.25. For each threshold value, determine if the new filter is as good as or better than the first filter. Then use the currently selected threshold value. However, switch if the new filter is better than the first/seed filter on the current threshold setting and a TotalWeight value (w), which is described as follows, is greater than or equal to zero. Initially, TotalWeight=0. For each non-current threshold setting:

\\ Assign each a weight based on its distance from the current setting $$d = \text{abs}\left[\frac{(IS - ICS)}{(IMAX - IMIN)}\right]$$

d=distance
IS=Index of Setting
ICS=Index of Current Setting
IMAX=Index of Max Setting
IMIN=Index of Min Setting $w=0.5^{(d/SHL)}$ If the new filter does better at this setting, then add its weight to TotalWeight; otherwise, subtract its weight from TotalWeight.

Note that this algorithm only determines whether or not the new filter is better at each threshold setting. It does not take into account how much better or worse the new filter is compared to the first/seed filter. The algorithm can be modified to take into account the degree of improvement or deterioration using functions of: new and old false negative rate, false positive rate, number of false negatives and/or number of false positives.

Figure 4A:
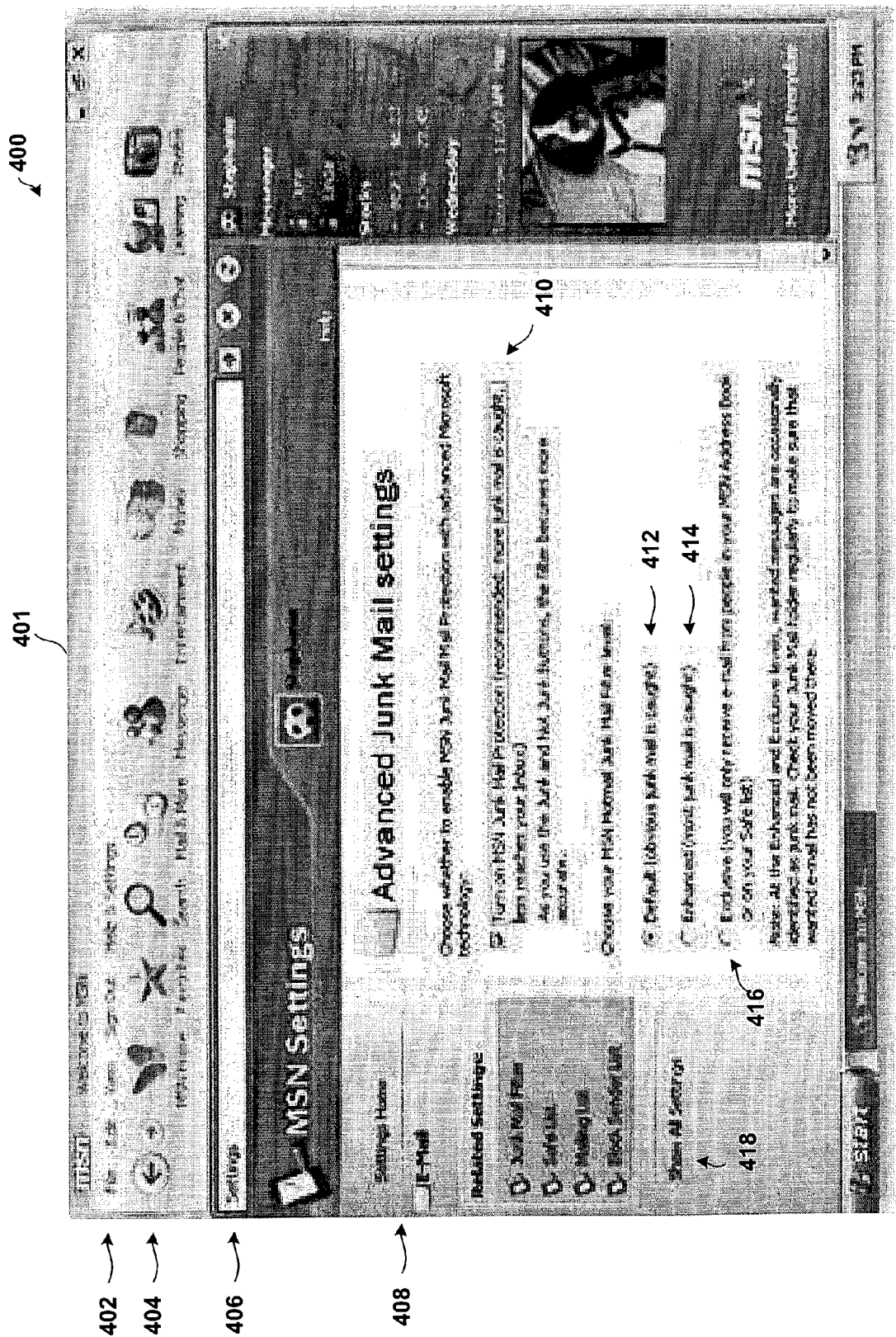
FIGS. 4A and 4B illustrate exemplary user interfaces for configuration of an adaptive junk mail filtering system in accordance with the subject invention.

Referring now to FIG. 4a, there is illustrated an exemplary user interface 400 that can be presented to a user for basic configuration of the herein disclosed adaptive junk filter system and user Mailbox. The interface 400 includes junk mail page (or window) 401, with a menu bar 402 that includes, but is not limited to, the following drop-down menu headings: File, Edit, View, Sign Out, and Help & Settings. The window 401 also includes a link bar 404 that facilitates navigation Forward and Back to allow the user to navigate to other pages, tools, and capabilities of the interface 400, including Home, Favorites, Search, Mail & More, Messenger, Entertainment, Money, Shopping, People & Chat, Learning, and Photos. A menu bar 406 facilitates selecting one or more configuration windows of the junk e-mail configuration window 401. As illustrated, a Settings sub-window 408 allows the user to select a number of basic configuration options for junk e-mail filtering. A first option 410 allows the user to enable junk e-mail filtering. The user can also choose to select various levels of e-mail protection. For example, a second option 412 allows the user to select a Default filter setting that catches only the most obvious junk mail. A third option 414 allows the user to choose more advanced filtering such that more junk e-mail is caught and discarded. A fourth option 416 allows the user to select for the receipt of e-mail only from trusted parties, for example, parties listed in the user's Address Book and on a Safe List. A Related Settings area 418 provides a means for navigating to those listed areas, including Junk Mail Filter, Safe List, Mailing List, and Block Sender List.

Figure 4B:
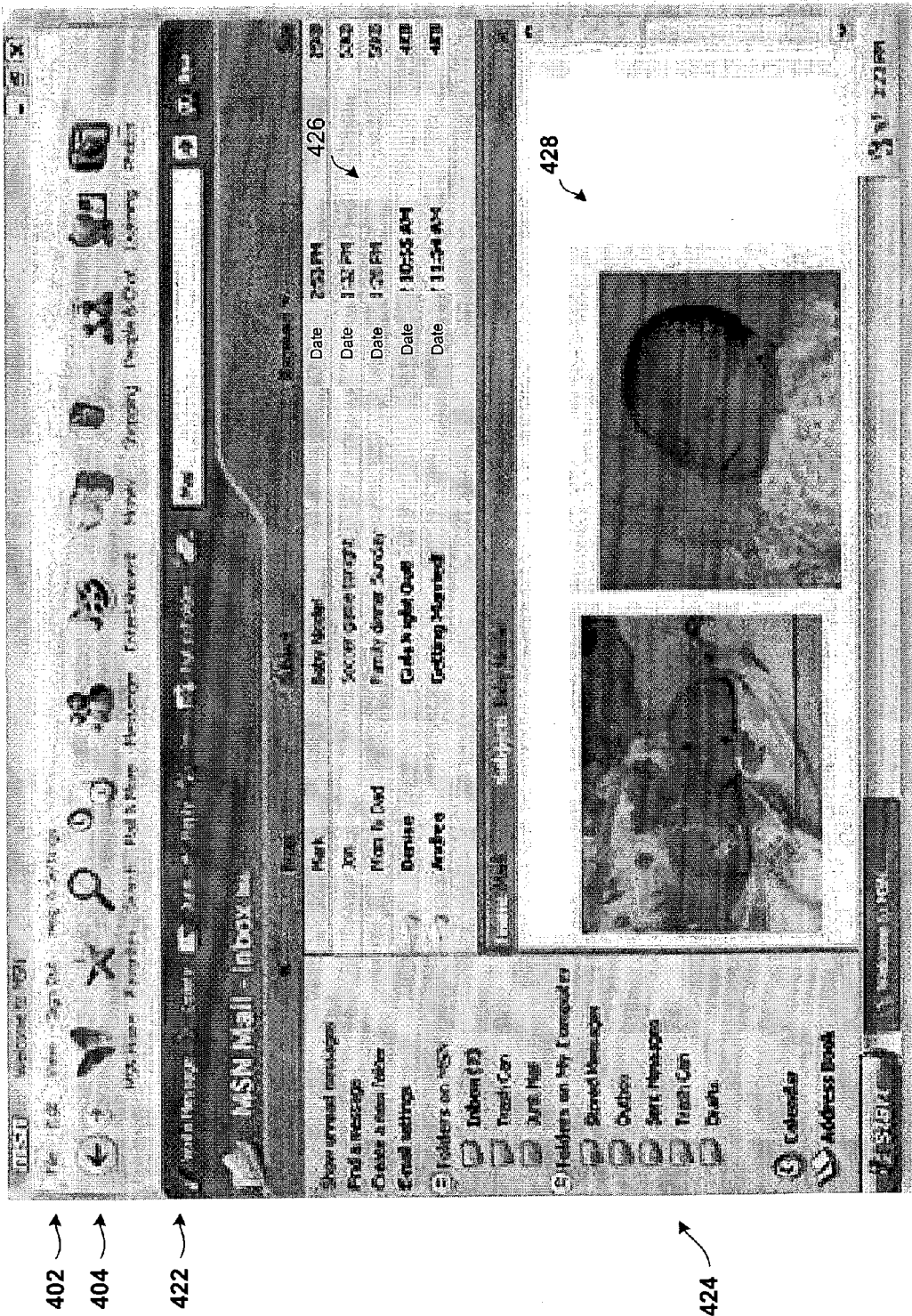

Referring now to FIG. 4b, there is illustrated a user mailbox window 420 of the user interface 400 that presents the user Mailbox features. The mailbox window 420 includes the menu bar 402 that includes, but is not limited to, the following drop-down menu headings: File, Edit, View, Sign Out, and Help & Settings. The mailbox window 420 also includes the link bar 404 that facilitates navigation Forward and Back to allow the user to navigate to other pages, tools, and capabilities of the interface 400, including Home, Favorites, Search, Mail & More, Messenger, Entertainment, Money, Shopping, People & Chat, Learning, and Photos. The window 420 also includes an e-mail control toolbar 422 that includes the following: a Write Message selection for allowing the user to create a new message; a Delete option for deleting a message; a Junk option for tagging a message as junk; a Reply option for replying to a message; a Put in Folder option for moving a message to a different folder; and a forward icon for forwarding a message.

The window 420 also includes a folder selection sub-window 424 that provides to the user the option to select for display the contents of the Inbox, Trash Can, and Junk Mail folders. The user can also access the contents of various folders, including Stored Messages, Outbox, Sent Messages, Trash Can, Drafts, a Demo program, and an Old Junk Mail folder. The number of messages in each of the Junk Mail and the Old Junk Mail folders is also listed next to the respective folder title. In a message list sub-window 426, a listing of the received messages is presented, according to the folder selection in the folder selection sub-window 424. In a message preview sub-window 428, a portion of the contents of the selected message is presented to the user for preview. The window 420 can be modified to include user preference information that is presented in a user preferences sub-window (not shown). The preferences sub-window can be included in a portion on the right side of the illustrated window 420, as illustrated in FIG. 4a. This includes, but is not limited to, weather information, stock market information, favorite website links, etc.

The illustrated interface 400 is not restricted to what has been shown, but can include other conventional graphics, images, instructional text, menu options, etc., that can be implemented to further aid the user in making filter selections and to navigate to other pages of the interface that may not be required top configure the e-mail filter.

Figure 5:
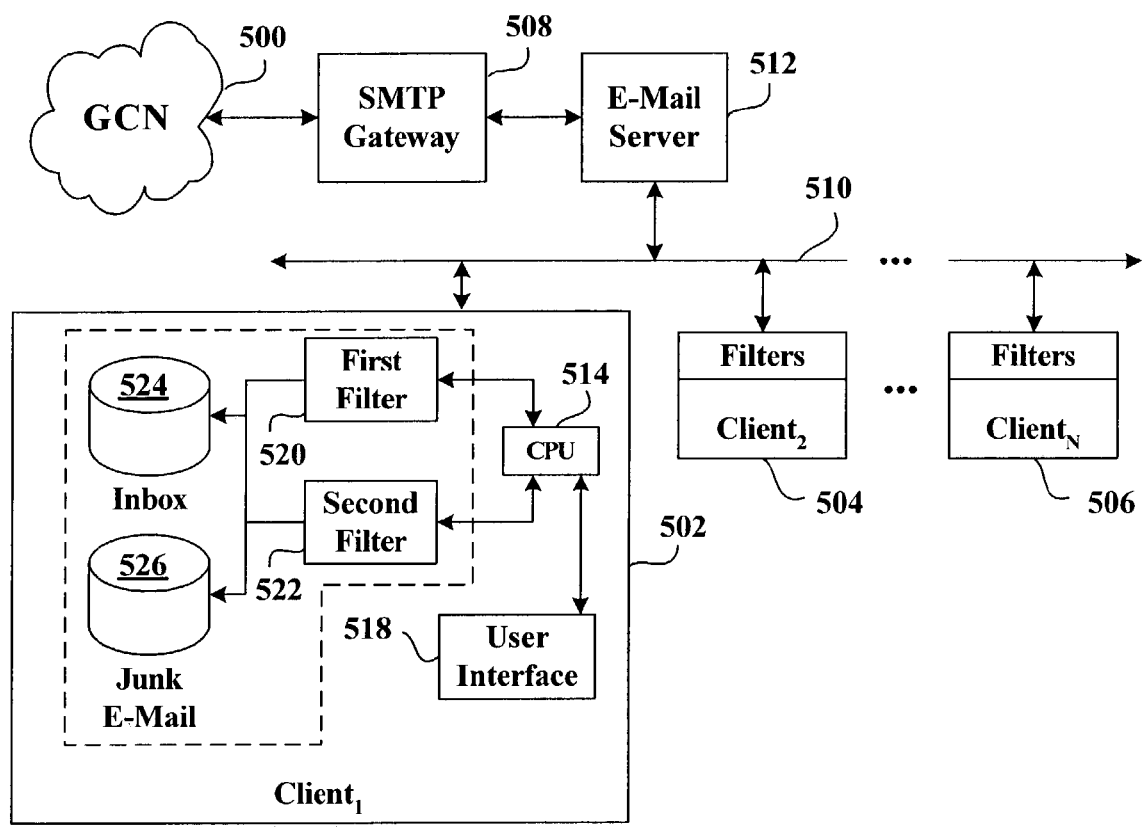
FIG. 5 illustrates a general block diagram of a message processing architecture that utilizes the subject invention.

Referring now to FIG. 5, there is illustrated a general block diagram of an architecture that utilizes the disclosed filtering technique. A network 500 is provided to facilitate communication of e-mail to and from one or more clients 502, 504 and 506 (also denoted as $Client_1$, $Client_2$, ..., $Client_N$). The network 500 can be a global communication network (GCN) such as the Internet, or a WAN (Wide Area Network), LAN (Local Area Network), or any other network architecture. In this particular implementation, an SMTP (Simple Mail Transport Protocol) gateway server 508 interfaces to the network 500 to provide SMTP services to a LAN 510. An e-mail server 512 operatively disposed on the LAN 510 interfaces to the gateway 508 to control and process incoming and outgoing e-mail of the clients 502, 504 and 506, which clients 502, 504 and 506 are also disposed on the LAN 510 to access at least the mail services provided thereon.

The client 502 includes a central processing unit (CPU) 514 that controls client processes—it is to be appreciated that the CPU 514 can comprise multiple processors. The CPU 514 executes instructions in connection with providing any of the one or more filtering functions described hereinabove. The instructions include, but are not limited to, the encoded instructions that execute at least the basic approach filtering methodology described above, at least any or all of the approaches that can be used in combination therewith for addressing failure of the user to make user corrections, uncertainty determination, threshold determination, accuracy rate calculations using the false positive and false negative rate data, and user interactivity selections. A user interface 518 is provided to facilitate communication with the CPU 514 and client operating system such that the user can interact to configure the filter settings and access the e-mail.

The client 502 also includes at least a first filter 520 (similar to the first filter 106) and a second filter 522 (similar to the second filter 108) operable according to the filter descriptions provided hereinabove. The client 502 also includes an e-mail inbox storage location (or folder) 524 for receiving filtered e-mail from at least one of the first filter 520 and the second filter 522, messages that are anticipated to be properly tagged e-mail. A second e-mail storage location (or folder) 526 can be provided for accommodating junk mail that the user determines is junk mail and chooses to store therein, although this may also be a trash folder. As indicated above, the inbox folder 524 can include e-mail that was filtered by either the first filter 520 or the second filter 522 depending on whether the second filter 522 was employed over the first filter 520 to provide equal or better filtering of incoming e-mail.

Once the user has received e-mail from the e-mail server 512, the user will then peruse the e-mails of the inbox folder 524 to read and determine the actual status of the filtered inbox e-mails messages. If a junk e-mail got through the first filter 520, the user will then perform an explicit or implicit user-correction function that indicates to the system that the message was actually junk e-mail. The first and second filters (520 and 522) are then trained based upon this user-correction data. If the second filter 522 is determined to have a better accuracy rate than the first filter 520, it will be employed in lieu of the first filter 520 to provide equal or better filtering. As indicated hereinabove, if the second filter 522 has a substantially equal accuracy rate to the first filter 520, it may or may not be employed. Filter training can be user selected to occur according to a number of predetermined criteria, as indicated above.

Figure 6:
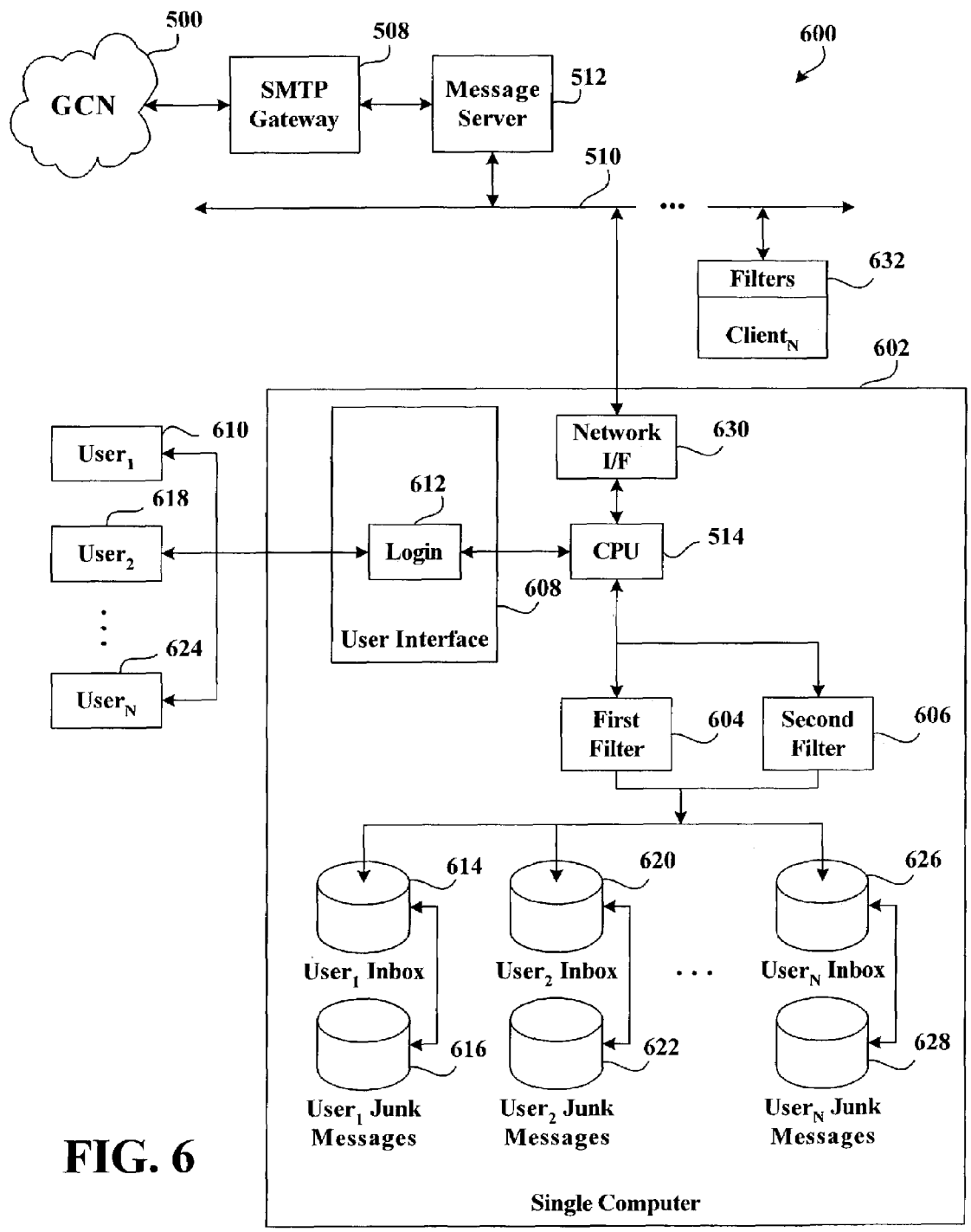
FIG. 6 illustrates a system having one or more client computers that facilitate multi-user logins, and filter incoming messages in accordance with techniques of the present invention.

Referring now to FIG. 6, there is illustrated a system 600 having one or more client computers 602 that facilitate multi-user logins, and filter incoming messages in accordance with the filtering techniques of the present invention. The client 602 includes a multiple login capability such that a first filter 604 and a second filter 606 respectively provide message filtering for each different user that logs in to the computer 602. Thus there is provided a user interface 608 that presents a login screen as part of the boot-up process of the computer operating system, or as required, to engage an associated user profile before the user can access his or her incoming messages. Thus when a first user 610 (also denoted $User_1$) chooses to access the messages, the first user 610 logs in to the client computer 602 via a login screen 612 of the user interface 608 by entering access information typically in the form of a username and user password. The CPU 514 processes the access information to allow the first user access, via a message communication application (e.g., a mail client) to only a first user inbox location 614 (also denoted $User_1$ Inbox) and first user junk message location 616 (also denoted $User_1$ Junk Messages).

When the CPU 514 receives the user login access information, the CPU 514 accesses the first user filter preferences information for utilizing the first filter 604 and the second filter 606 for then filtering incoming messages that may be downloaded to the client computer 602. The filter preferences information of all users ($User_1$, $User_2$, . . . , $User_N$) allowed to log in to the computer may be stored locally in a filter preferences table. The filter preferences information is accessible by the CPU 514 when the first user logs in to the computer 602 or engages the associated first user profile. Thus the false negative and false positive rate data of the first user 610 for both of the first and second filters (604 and 606) is processed to engage either the first filter 604 or the second filter 606 for filtering messages to be downloaded. As indicated hereinabove in accordance with the disclosed invention, the false negative and false positive rate data is derived from at least the user-correction process. Once the first user 610 downloads the messages, the false negative and false positive rate data may be updated according to erroneously tagged messages. At some point in time before another user logs in to the computer 602, the updated rate data for the first user is then stored back in the filter preferences table for future reference.

When a second user 618 logs in, the false negative and false positive rate data may change in accordance with filtering preferences associated therewith. After the second user 618 enters his or her login information, the CPU 514 accesses the second user filter preferences information and engages either the first filter 604 or the second filter 606 accordingly. The computer operating system, in conjunction with the computer messaging application, restricts the messaging services for the second user 618 to accessing only a second user inbox 620 (also denoted $User_2$ Inbox) and a second user junk message location 622 (also denoted $User_2$ Junk Messages). The false negative and false positive rate data of the second user 618 user for both of the first and second filters (604 and 606) is processed to engage either the first filter 604 or the second filter 606 for filtering messages of the second user 618 to be downloaded. As indicated hereinabove in accordance with the disclosed invention, the false negative and false positive rate data is derived from at least the user-correction process. Once the second user 618 downloads the messages, the false negative and false positive rate data may be updated according to erroneously tagged messages.

Operation for an $N^{th}$ user 624, denoted $User_N$, is provided in a manner similar to that of the first and second users (610 and 618). As with all other users, the Nth user 624 is restricted to only the user information associated with the Nth user 624, and thus is allowed access only to the $User_N$ Inbox 626 and $User_N$ Junk Messages location 628, and no other inboxes (614 and 620) and junk message locations (616 and 622) when utilizing the messaging application.

The computer 602 is suitably configured to communicate with other clients on the LAN 510 and to access network services disposed thereon by utilizing a client network interface 630. Thus there is provided the message server 512 for receiving messages from the SMTP (or message) gateway 508 to control and process incoming and outgoing messages of the clients (602 and 632 (also denoted $Client_N$)), and any other wired or wireless devices operable to communicate messages via the LAN 510 to the message server 512. The clients (602 and 632) are disposed in operable communication with the LAN 510 to access at least the message services provided thereon. The SMTP gateway 508 interfaces to the GCN 500 to provide compatible SMTP messaging services between the network devices of the GCN 500 and messaging entities on the LAN 510.

It is appreciated that rate-data averaging, as described above, may be utilized to determine the best average setting for employing the filters (604 and 606). Similarly, the best rate data of the users allowed to log in to the computer 602 can also be used to configure the filters for all users that log therein.

Figure 7:
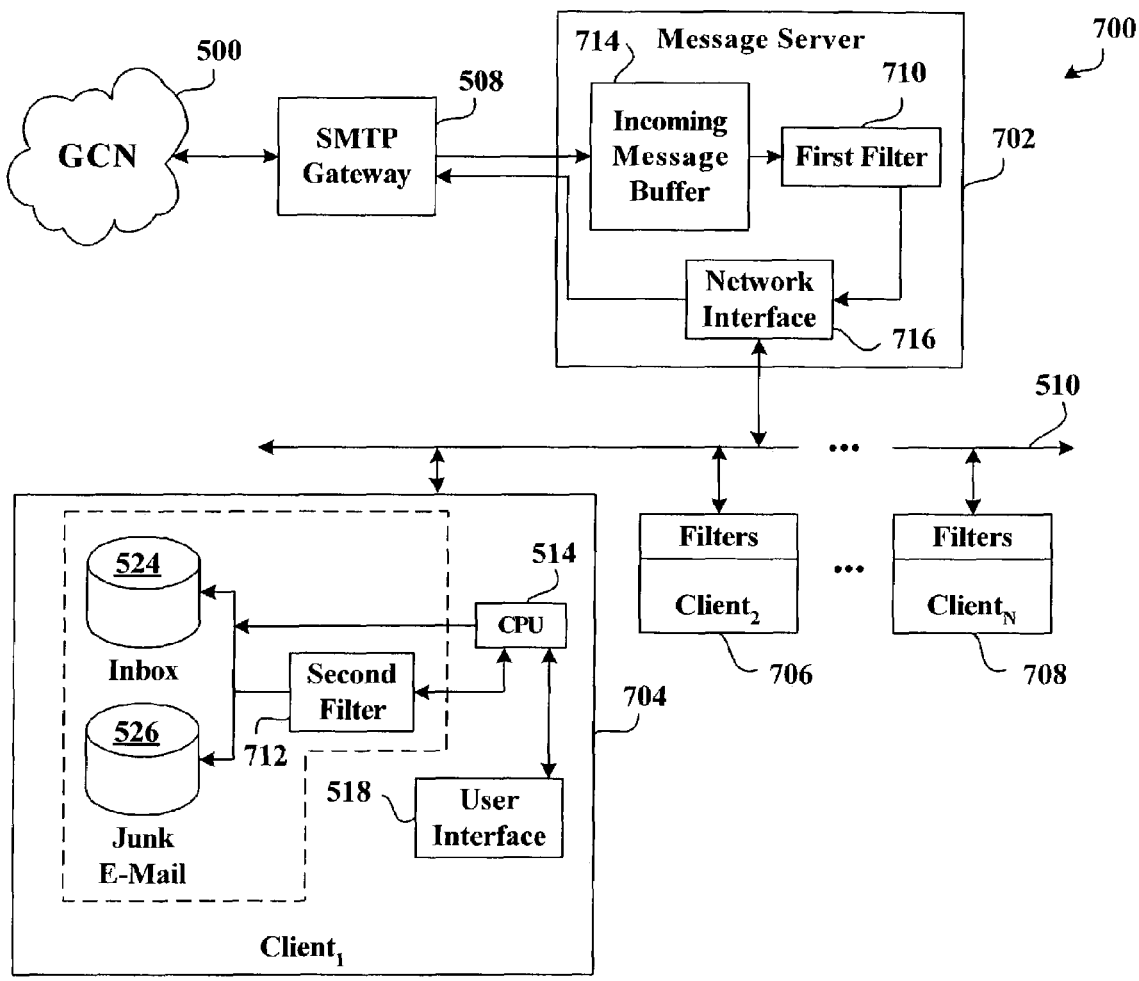
FIG. 7 illustrates a system where initial filtering is performed on a message server and secondary filtering is performed on one or more clients in accordance with the subject invention.

Referring now to FIG. 7, there is illustrated a system 700 where initial filtering is performed on a message server 702 and secondary filtering is performed on one or more clients. The GCN 500 is provided to facilitate communication of messages (e.g., e-mail) to and from one or more clients (704, 706 and 708) (also denoted as $Client_1$, $Client_2$, ..., $Client_N$). The SMTP gateway server 508 interfaces to the GCN 500 to provide compatible SMTP messaging services between the network devices of the GCN 500 and messaging entities on the LAN 510.

The message server 702 is operatively disposed on the LAN 510, and interfaces to the gateway 508 to control and process incoming and outgoing messages of the clients 704, 706, and 708, and any other wired or wireless devices operable to communicate messages via the LAN 510 to the message server 702. The clients (704, 706, and 708) (e.g., wired or wireless devices) are disposed in operable communication with the LAN 510 to access at least the message services provided thereon.

According to one aspect of the present invention, the message server 702 performs initial filtering by employing a first filter 710 (similar to first filter 106), and the client perform secondary filtering using a second filter 712 (similar to the second filter 108). Thus incoming messages are received from the gateway 508 into an incoming message buffer 714 of the message server 702 for temporary storage as the first filter 710 processes the messages to determine whether they are junk or non-junk messages. The buffer 714 can be a simple FIFO (First-In-First-Out) architecture such that all messages are processed on a first-come-first-served basis. It can be appreciated however, that the message server 702 can filter process the buffered messages according to a tagged priority. Thus the buffer 714 is suitably configured to provide message prioritization such that messages tagged with a higher priority by the sender are forwarded from the buffer 714 for filtering before other messages that are tagged with lower priorities. Priority tagging can be based upon other criteria unrelated to the sender priority tag, including but not limited to the size of the message, date the message was sent, whether the message has an attachment, size of the attachment, how long the message has been in the buffer 714, etc.

In order to develop the false positive and false negative rate data of the first filter 710, an administrator can sample the output of the first filter 710 to determine how many normal messages are mislabeled as junk and how many junk messages are mislabeled as normal. As indicated hereinabove in accordance with one aspect of the present invention, this rate data of the first filter 710 is then used as a basis for determining the new false positive and false negative rate data of the second filter 712.

In any case, once the first filter 710 has filtered the message, it is routed from the server 702 through a server network interface 716 across the network 510 to the appropriate client (e.g., the first client 704) based upon the client destination IP address. The first client 704 includes the CPU 514 that controls all client processes. The CPU 514 communicates with the message server 702 to obtain the false positive and negative rate data of the first filter 710, and performs the comparison with the false positive and negative rate data of the second filter 712 to determine when the second filter 712 should be employed. If the results of the comparison are such that the second filter rate data is now worse than the rate data of the first filter 710, the second filter 712 is employed, and the CPU 514 communicates to the message server 702 to allow messages destined to the first client 704 to pass through the server 702 unfiltered.

When the user of the first client 704 reviews the received messages and performs user-correction, the new false positive and negative rate data of the second filter 712 is updated. If the new rate data becomes worse than the first rate data, the first filter 710 will then be re-employed to provide filtering for the first client 704. The CPU 514 continues to make rate-data comparisons in order to determine when to toggle filtering between the first and second filters (710 and 712) for that particular client 704.

The CPU 514 executes an algorithm operable according to instructions for providing any of the one or more filtering functions described herein. The algorithm includes, but is not limited to, the encoded instructions that execute at least the basic approach filtering methodology described above, at least any or all of the approaches that can be used in combination therewith for addressing failure of the user to make user corrections, uncertainty determination, threshold determination, accuracy rate calculations using the false positive and false negative rate data, and user interactivity selections. The user interface 518 is provided to facilitate communication with the CPU 514 and client operating system such that the user can interact to configure the filter settings and access messages.

The client 502 also includes at least the second filter 712 operable according to the filter descriptions provided hereinabove. The client 502 also includes the message inbox storage location (or folder) 524 for receiving filtered messages from at least one of the first filter 710 and the second filter 712, messages that are anticipated to be properly tagged messages. The second message storage location (or folder) 526 can be provided for accommodating junk mail that the user determines is junk mail and chooses to store therein, although this may also be a trash folder. As indicated above, the inbox folder 524 can include messages that were filtered by either the first filter 710 or the second filter 712 depending on whether the second filter 712 was employed over the first filter 710 to provide equal or better filtering of incoming messages.

As indicated hereinabove, once the user has downloaded messages from the message server 702, the user will then peruse the messages of the inbox folder 524 to read and determine the actual status of the filtered inbox messages. If a junk message got through the first filter 710, the user will then perform an explicit or implicit user-correction function that indicates to the system that the message was actually a junk message. The first and second filters (710 and 712) are then trained based upon this user-correction data. If the second filter 712 is determined to have a better accuracy rate than the first filter 710, it will be employed in lieu of the first filter 710 to provide equal or better filtering. And if the second filter 712 has a substantially equal accuracy rate to the first filter 710, it may or may not be employed. Filter training can be user-selected to occur according to a number of predetermined criteria, as indicated above.

It is appreciated that since other clients (706 and 708) utilize the message server 702 for filtering messages, that new rate data of the respective clients (706 and 708) will affect the filtering operation of the first filter 710. Thus the respective clients (706 and 708) also communicate with the message server 702 to enable or disable the first filter 710 according to respective new rate data of the second filters of those clients (706 and 708). The message server 702 may include a filter preference table of client preferences related to the respective client filter requirements. Thus every buffered message is interrogated for the destination IP address, and processed according to the filter preferences associated with that destination address stored in the filter table. Thus while a broadcast junk message destined to the first client 704 may be required to be processed by the second filter 712 of the first client 704, according to the rate data comparison results of the first client 704, the same junk message also destined for the second client 706 may be required to be processed by the first filter 710 of the message server 702, in accordance with the results of the rate data comparisons obtain therewith.

It is further appreciated that the individual new rate data of the individual clients (704, 706, and 708) could be received and processed concurrently by the server 702 to determine the average thereof. This average value could then be used to determine whether to toggle use the first filter 710 or the second filters 712 of the clients, individually or as a group. Alternatively, the best new rate data of the clients (704, 706, and 708) could be determined by the server 702, and used to toggle between the first filter 710 and the client filters 712, individually or as a group.

Figure 8:
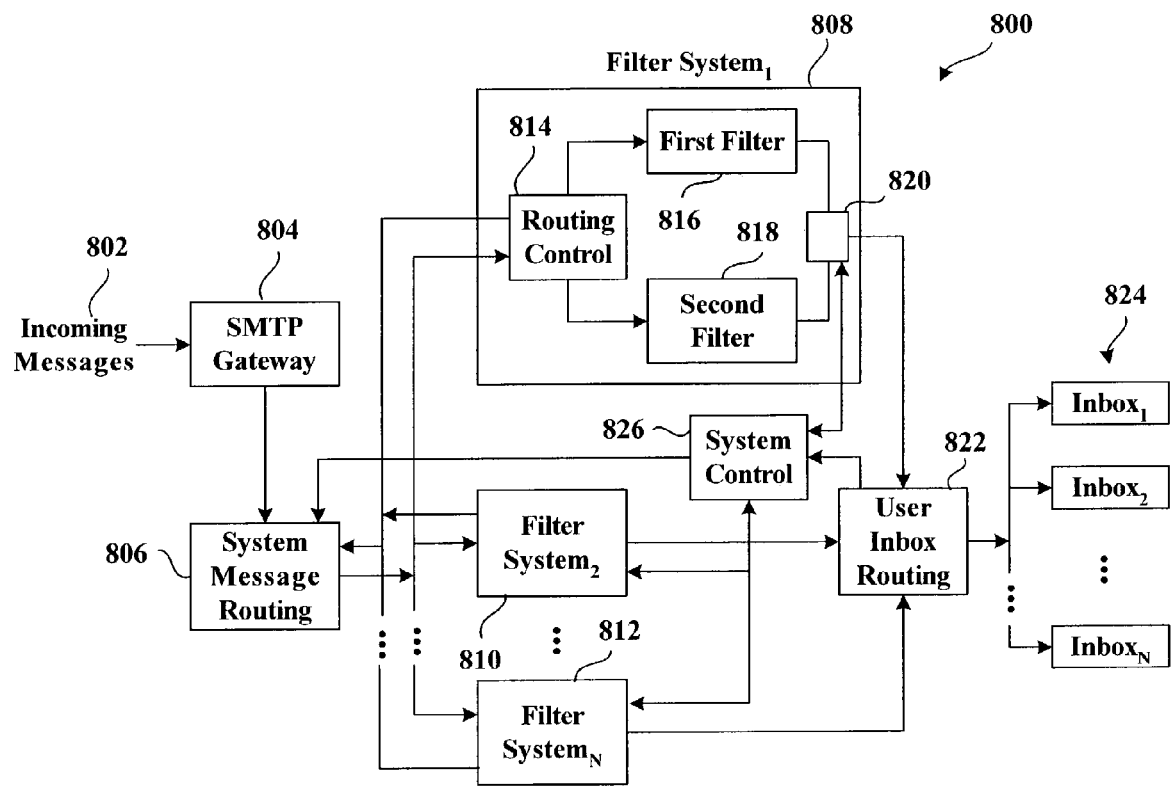
FIG. 8 illustrates a block diagram of an adaptive filtering system for a large-scale implementation.

Referring now to FIG. 8, there is illustrated an alternative embodiment of a large-scale filtering system 800 utilizing the filtering aspects of the present invention. In more robust implementations where message filtering is performed on a mass scale by system-wide mail systems, e.g., an Internet service provider, multiple filtering systems can be employed to process a large number of incoming messages. A large number of incoming messages 802 are received and addressed to many different user destinations. The messages 802 enter the provider system via, for example, an SMTP gateway 804 and are then transmitted to a system message routing component 806 for routing to various filter systems 808, 810, and 812 (also denoted respectively as Filter System$_1$, Filter System$_2$, . . . , Filter System$_N$).

Each filter system (808, 810, and 812) includes a routing control component, a first filter, a second filter, and an output buffer. Thus the filter system 808 includes a routing control component 814 for routing messages between a first system filter 816 and a second system filter 818. The outputs of the first and second filters (816 and 818) are connected to an output buffer 820 for temporarily storing messages prior to the messages being transmitted to a user inbox routing component 822. The user inbox routing component 822 interrogates each message received from the output buffer 820 of the filter system 808 for the user destination address, and routes the message to the appropriate user inbox of a plurality of user inboxes 824 (also denoted Inbox$_1$, Inbox$_2$, . . . , Inbox$_N$)

The system message routing component 806 includes a load balancing capability to route messages between the filter systems (808, 810, and 812) according to the availability of a bandwidth of the filters systems (808, 810, and 812) to accommodate message processing. Thus if an incoming message queue (not shown, but part of the routing component 814) of the first filter system 808 is backed up and cannot accommodate the throughput needed for the system 800, status information of this queue is fed back to the system routing component 806 from the routing control component 814 so that incoming messages 802 are then routed to the other filter systems (810 and 812) until the incoming queue of the system 814 is capable of receiving further messages. Each of the remaining filter systems (810 and 812) includes this incoming queue feedback capability such that the system routing component 806 can process message load handling between all available filter systems Filter System$_1$, Filter System$_2$, . . . , Filter System$_N$.

The adaptive filter capability of the first system filter 808 will now be described in detail. In this particular system implementation, the system administrator would be tasked with determining what constitutes junk mail for the system 800 by providing feedback as to accuracy of the filters to provide tagged/untagged messages. That is, the administrator performs user-correction in order to generate the FN and FP information for each of the respective systems (808, 810, and 812). Due to the large number of incoming messages, this could be performed according to a statistical sampling method that mathematically provides a high degree of probability that the sample being taken reflects the accuracy of the filtering performed by a respective filter system (808, 810, and 812) in determining what is a junk message and a non-junk message.

In furtherance thereof, the administrator would take a sample of messages from the buffer 820 via a system control component 826, and verify the accuracy of message tagging on the sample. The system control component 826 can be a hardware and/or software processing system that interconnects to the filter systems (808, 810, and 812) for monitor and control thereof. Any messages incorrectly tagged would be used to establish the false negative (FN) and false positive (FP) rate data for the first filter 816. This FN/FP rate data is then used on the second filter 818. If the rate data of the first filter 816 falls below a threshold value, the second filter 818 can be enabled to provide at least as good filtering as the first filter 816. When the administrator again performs user-correction sampling from the buffer 820, if the FN/FP data of the second filter 818 is worse than that of the first filter 816, the routing control component 814 will process this FN/FP data of the second filter 818 and determine that message routing should be switched back to the first filter 816.

The system control component 826 interfaces to the system message routing component 806 to exchange data therebetween, and provide administration thereof by the administrator. The system control component 826 also interfaces the output buffer of the remaining systems Filter System$_2$, . . . , Filter System$_N$ to provide sampling capability of those systems. The administrator can also access the user inbox routing component 822 via the system control component 826 to oversee operation of thereof.

The accuracy of a filter, as described hereinabove with respect to FIG. 1, can be extended to the accuracy of a plurality of filtering systems. The FN/FP rate data of the first system 808 can then be used to train the filters of the second system 810 and third system 812 to further enhance the filtering capabilities of the overall system 800. Similarly, load control can be performed according to the FN/FP data of a particular system. That is, if the overall FN/FP data of the first system 808 is worse than the FN/FP data of the second system 810, more messages can be routed to the second system 810 than the first system 808.

It is appreciated that the filter systems (808, 810, and 812) can be separate filter algorithms each running on dedicated computers, or combinations of computers. Alternatively, where the hardware capability exists, the algorithms can be running together on a single computer such that all filtering is performed on a single robust machine.

Figure 9:
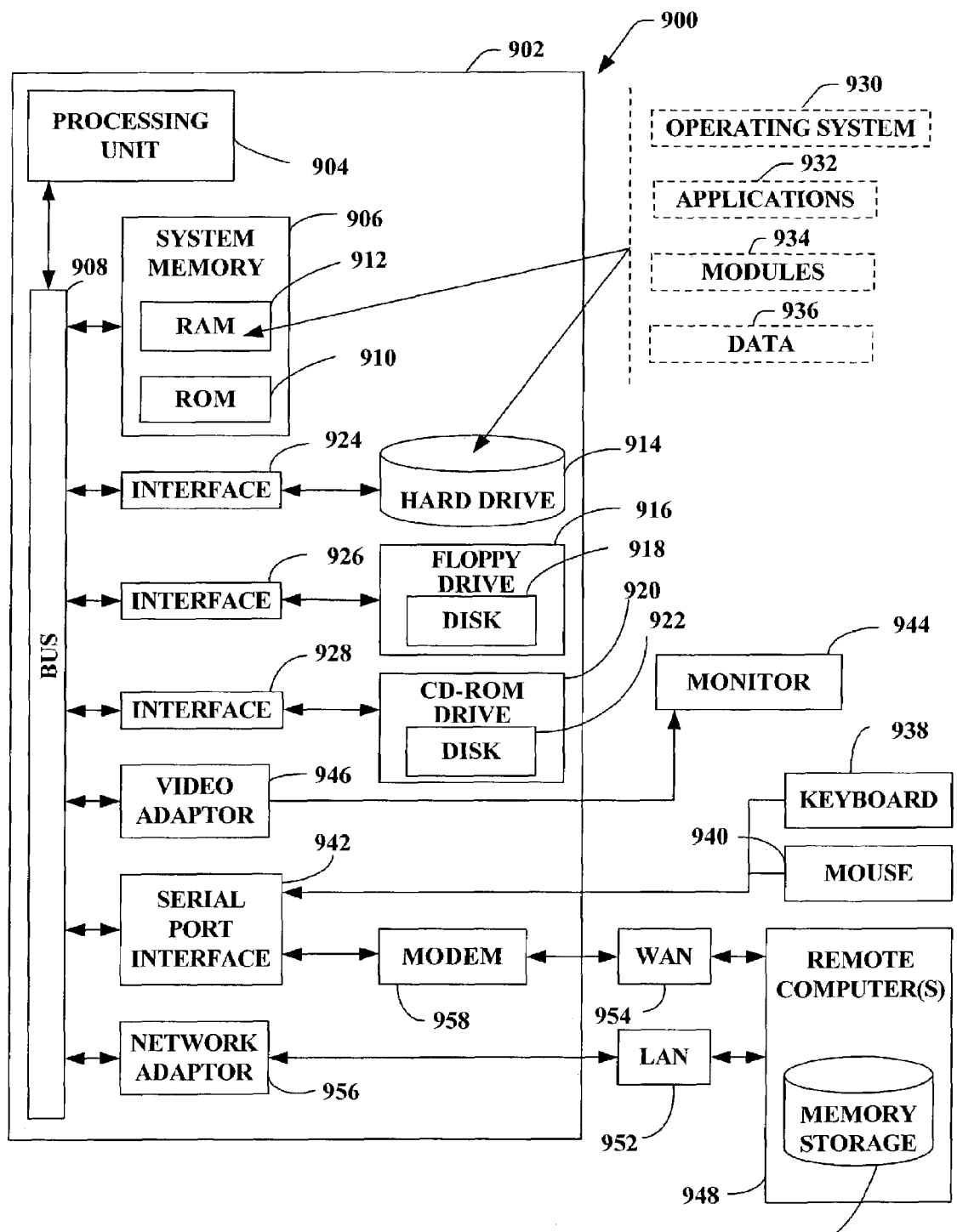
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 9, the exemplary environment 900 for implementing various aspects of the invention includes a computer 902, the computer 902 including a processing unit 904, a system memory 906 and a system bus 908. The system bus 908 couples system components including, but not limited to the system memory 906 to the processing unit 904. The processing unit 904 may be any of various commercially available processors. Dual microprocessors and other multi-processor architectures also can be employed as the processing unit 904.

The system bus 908 can be any of several types of bus structure including a memory bus or memory controller, a peripheral bus and a local bus using any of a variety of commercially available bus architectures. The system memory 906 includes read only memory (ROM) 910 and random access memory (RAM) 912. A basic input/output system (BIOS), containing the basic routines that help to transfer information between elements within the computer 902, such as during start-up, is stored in the ROM 910.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other optical media). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934 and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a LAN 952 and a WAN 954. Such networking environments are commonplace in offices, enterprise-wide computer networks, intranets and the Internet.

When used in a LAN networking environment, the computer 902 is connected to the local network 952 through a network interface or adapter 956. When used in a WAN networking environment, the computer 902 typically includes a modem 958, or is connected to a communications server on the LAN, or has other means for establishing communications over the WAN 954, such as the Internet. The modem 958, which may be internal or external, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

In accordance with one aspect of the present invention, the filter architecture adapts to the degree of filtering desired by the particular user of the system on which the filtering is employed. It can be appreciated, however, that this "adaptive" aspect can be extended from the local user system environment back to the manufacturing process of the system vendor where the degree of filtering for a particular class of users can be selected for implementation in systems produced for sale at the factory. For example, if a purchaser decides that a first batch of purchased systems are to be provided for users that do should not require access to any junk mail, the default setting at the factory for this batch of systems can be set high, whereas a second batch of systems for a second class of users can be configured for a lower setting to all more junk mail for review. In either scenario, the adaptive nature of the present invention can be enabled locally to allow the individual users of any class of users to then adjust the degree of filtering, or if disabled, prevented from altering the default setting at all. It is also appreciated that a network administrator who exercises comparable access rights to configure one or many systems suitably configured with the disclosed filter architecture, can also implement such class configurations locally.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data filtering system, comprising:
   a first filter configured to tag messages as junk based at least in part on junk information associated with the messages, the first filter having associated therewith a false positive rate and a false negative rate;
   one or more second filters configured to tag the messages as junk based at least in part on junk information associated with the messages, the one or more second filters initially associated with the false positive rate and the false negative rate of the first filter
   a filter output configured to receive tagged and untagged messages from the first filter and the one or more second filters;
   a user correction component configured to receive user actions relating to the tagged and untagged messages sent to the filter output and to output false positive data and false negative data based on the user actions relating to the tagged and untagged messages sent to the filter output; and
   a filter control configured to:
     receive the false positive data and the false negative data;
     adjust the false positive rate or the false negative rate or both of at least one of the one or more second filters based on its false positive data or its false negative data or both; and
     route subsequently received messages between the first filter and the one or more second filters according to a threshold and their respective false positive rates, false negative rates or both.

2. The system of claim 1, the user actions comprising implicitly tagging the messages.

3. The system of claim 1, the user actions comprising explicitly tagging the messages as junk.

4. The system of claim 1, the first filter and the one or more second filters further configured to tag the messages as junk based at least in part on good data.

5. The system of claim 1, wherein the filter control is further configured to adjust the false positive rate and the false negative rate of at least one of the one or more second filters based on the content of other user's messages.

6. The system of claim 1, wherein configured to route subsequently received messages between the first filter and the one or more second filters according to a threshold and their respective false positive rates, false negative rates or both comprises configured to route the messages to a filter having a best false positive rate.

7. The system of claim 1, wherein the filter control is further configured to adjust the false positive rate, false negative rate or both of at least one of the one or more second filters after a predetermined number of messages are tagged, a predetermined time has occurred or both.

8. The system of claim 1, wherein the system is further configured to select the threshold from a plurality of generated threshold values comprising an average threshold value over eligible threshold values, a threshold value with lowest false positive rate, or a threshold value that maximizes user's expected utility based upon a p* utility function or combinations thereof.

9. The system of claim 1, wherein the system is further configured to select the threshold from a plurality of threshold values.

10. A portable computing device comprising the system of claim 1.

11. The device of claim 10 being a personal data assistant, a telephone or a laptop computer.

12. A method of facilitating data filtering, comprising:
    automatically filtering incoming messages according to a false positive rate and a false negative rate of a seed filter;
    receiving user-correction data relating to at least one filtered message;
    determining an accuracy of the seed filter based on the user-correction data relating to the at least one filtered message;
    training a new filter using the user-correction data;
    determining a false positive rate and a false negative rate of the new filter;
    determining an accuracy of the new filter based on the false positive rate and the false negative rate of the new filter; and
    employing the new filter in lieu of the seed filter if the accuracy of the new filter is better than that of the seed filter.

13. The method of claim 12, the user-correction data comprising user-correction data relating to overriding an initial classification of the at least one filtered message.

14. The method of claim 12, wherein determining the false positive rate and the false negative rate of the new filter comprises determining the false positive rate and the false negative rate of the new filter after a predetermined number of junk and non-junk messages are labeled by a user, a predetermined time has occurred or both.

15. The method of claim 12 implemented by computer-executable instructions stored on one or more computer-readable media.

16. A computer-readable medium having computer-executable components stored thereon to effect the system of claim 1.

17. A computer comprising the system of claim 1.

18. A network comprising the system of claim 1.

19. A data filtering system, comprising:
    first means for filtering messages, the first means for filtering messages having associated therewith a false positive rate and a false negative rate;
    new means for filtering the messages, the new means for filtering the messages trained according to the false positive rate and the false negative rate associated with the first means for filtering the messages;
    means for determining a new false positive rate and a new false negative rate associated with the new means for filtering the messages as a function of threshold;
    means for determining a threshold of the new means for filtering the messages;
    means for employing the new means for filtering the messages in lieu of the first means for filtering the messages if a threshold exists for the new means for filtering the messages such that the new false positive rate and new false negative rate associated with the new means for filtering the messages are together considerd better than the false positive rate and the false negative rate associated with the first means for filtering the messages.

* * * * *